Nov. 4, 1930.  F. W. YOUNG  1,780,777
FILTERING DEVICE
Filed July 27, 1926

Inventor
FRANK W. YOUNG
By his Attorneys
Redding, Greeley, O'Shea + Campbell

Patented Nov. 4, 1930

1,780,777

UNITED STATES PATENT OFFICE

FRANK W. YOUNG, OF VERONA, NEW JERSEY

FILTERING DEVICE

Application filed July 27, 1926. Serial No. 125,260.

This invention relates to improvements in drying devices and more particularly to devices wherein entrained moisture is removed from a cake or the like formed by the separation of solids from a liquid within which such solids have been suspended. It has especial reference to situations in which a rotary drying device is availed of as the drying medium for a filter cake formed on a continuous filter and so re-enforced that the cake may be removed as a band or belt for further or subsequent treatment. In a co-pending application of Arthur Wright and Frank W. Young, Ser. No. 115,481 filed June 11th, 1926 such a re-enforced cake or deposit is illustrated as removed from the filter drum and carried into contact with a heated drum where the liquid content of the cake is reduced. The present invention has for its object a modification of the cake heating means. Accordingly the re-enforced cake is conducted away from the filter drum and brought into contact with a plurality of heated rolls preferably supported in close proximity to the filtering apparatus. More particularly, a plurality of heated rolls are mounted upon the frame supporting the compressor belt carried with the filter and the re-enforced deposit is brought into contact with the surface of the rolls, as many of which as desired being heated, to obtain the requisite drying effect.

The invention also has for its object the stripping of the cake from the re-enforcement in a simple and expeditious manner after the moisture reducing operation is finished. To this end the lowermost heating roll or that roll in which the re-enforcement comes last in contact is grooved for the reception of the cake re-enforcing strands which there lie within the grooves to cause the separation of the cake therefrom.

These and other objects of the invention and the means for their attainment will be more apparent from the following detailed description of a preferred embodiment of the invention illustrated in the accompanying drawings in which.

While the invention has been illustrated and will now be described in connection with a rotary type filter it is to be understood that its application is not limited to such use but is equally applicable in any situation wherein the moisture content of a deposit formed and re-enforced in any manner is to be reduced.

Figure 1:
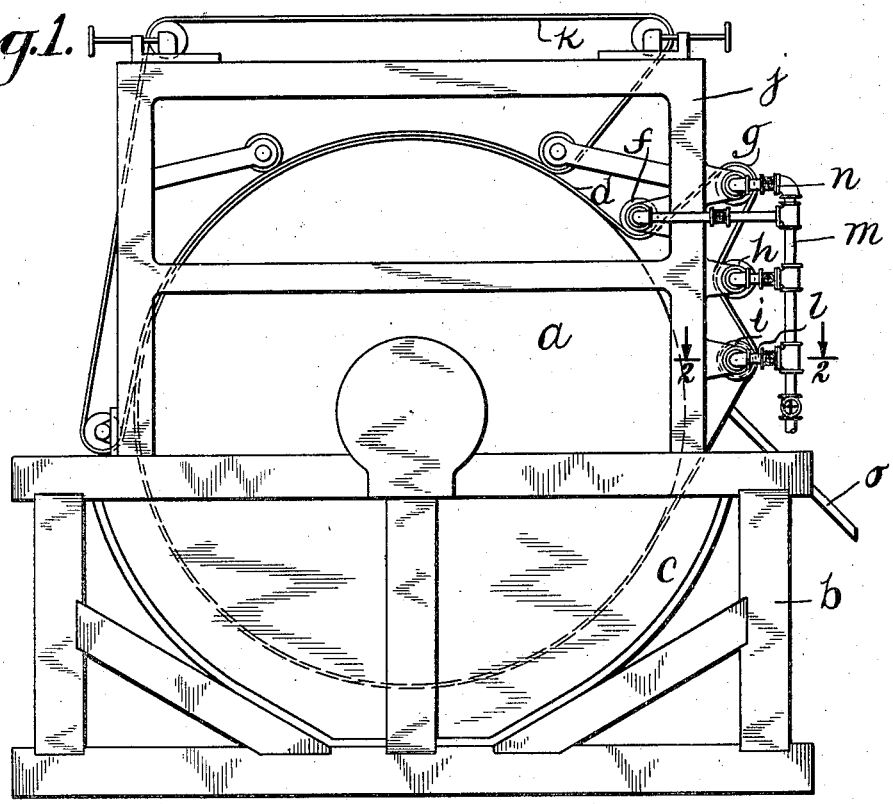
Figure 1 is a view in side elevation showing a filter of the continuous rotary drum type to which are applied the devices for reducing the moisture content in accordance with the present invention.
Figure 2:
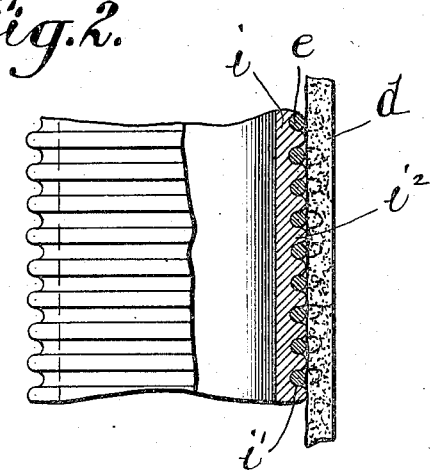
Figure 2 is a fragmentary horizontal sectional view taken in the plane indicated by the line 2—2 in Figure 1, looking in the direction of the arrows and showing the utilization of one of the heating rolls to strip the cake from the re-enforcement.

In Figure 1 there is illustrated a rotary drum type filter $a$ supported from a frame $b$ and adapted to be partially immersed in liquid contained in a tank $c$. As in the co-pending application, a cake or deposit $d$ is adapted to be formed upon the peripheral surface of the drum by the migration thereto of solid particles suspended in the liquid in the tank and this cake is adapted to be removed from the surface of the drum continuously by a re-enforcing medium. Various types of re-enforcing medium may be availed of. There is illustrated as the re-enforcing medium, a plurality of independent strands $e$, as in the application referred to above, about which the cake $d$ is formed or deposited and built up. These strands encircle the drum and pass about a plurality of heating rolls $f$, $g$, $h$ and $i$ supported upon the frame work $j$ which also supports the compressor belt $k$. The rolls may be heated in any convenient manner. They are shown as heated by steam conducted thereto by branches $l$ from a manifold $m$ and the degree of heat applied to the cake is controlled by controlling the temperature of the respective rolls by the valves $n$.

After the moisture content of the re-enforced cake has been reduced to the desired degree the cake is stripped from the re-enforcement, whereafter the re-enforcement continues about the filter drum. Any desired type of cake stripping instrumentality may be availed of. In the illustrated embodiment a novel cake stripping device is disclosed. The last roll $i$ is formed on its peripheral surface with a plurality of circumferential grooves $i'$ within which the strands $e$ lie, respectively, the surface $i^2$ of the roll between the grooves serving to pry or shear the cake from off the strands. The broken pieces of cake fall upon the deflector $o$ which diverts them from the machine to a hopper or other container.

It will thus be seen that a cake heating medium has been associated with a cake forming instrumentality in a compact and simple manner which admits of regulation of the heat and the removal of the cake in an expeditious and easy manner after the moisture contents has been reduced to the desired degree.

Various modifications may be made in the number, location and distribution of the heating instrumentalities as well as in their dimensions and manner of heating and also in the means for stripping the deposit from the re-enforcement, the re-enforcement itself and the use to which the invention may be put without departing from the spirit and scope of the invention.

What is claimed is:

1. In combination, a cake forming instrumentality, a plurality of heated rolls, and a filter cake re-enforcement comprising a plurality of substantially separate, endless strands encircling the instrumentality and the rolls.

2. In combination, a continuous filter, a plurality of rolls supported adjacent the filter, means to selectively heat the rolls, a cake re-enforcement comprising a plurality of substantially separate, endless strands encircling the filter and rolls to convey cake from the filter into contact with the rolls, and means to strip the cake from the re-enforcement.

3. The combination with a cake forming instrumentality and a cake re-enforcement, of a grooved heated cake discharge roll.

4. In combination, a cake forming instrumentality, a plurality of rolls, means to heat the rolls, means to convey cake from the said instrumentality into contact with the rolls and grooves in the last heated roller for the conveying means to strip the cake therefrom.

5. The combination with a cake forming instrumentality, a cake re-enforcement consisting of a plurality of separate strands, and a grooved heated cake discharge roll to receive the strands of the re-enforcement.

6. In combination, a cake forming instrumentality, a heated roll in close proximity to but not touching the cake forming instrumentality with which the cake comes into contact as it leaves the cake forming instrumentality, a plurality of heated rolls in proximity to the first, and a cake re-enforcement comprising a plurality of spaced, endless strands to convey the cake from the cake forming instrumentality to the rolls.

7. In combination, a cake forming instrumentality, a heated roll in close proximity to the cake forming instrumentality and with which the cake comes into contact immediately after it leaves the latter, a plurality of heated rolls proximate to the first roll, and a cake re-enforcement comprising a plurality of spaced, endless strands to convey cake from the cake forming instrumentality into contact with the rolls.

8. In combination a cake forming instrumentality, a plurality of heating rolls, means to convey cake from said instrumentality in contact with the rolls comprising a plurality of separate, endless strands encircling the instrumentality and the rolls and means to control the temperature of the respective rolls.

This specification signed this 23rd day of July, A. D. 1926.

FRANK W. YOUNG.